Figure 1:
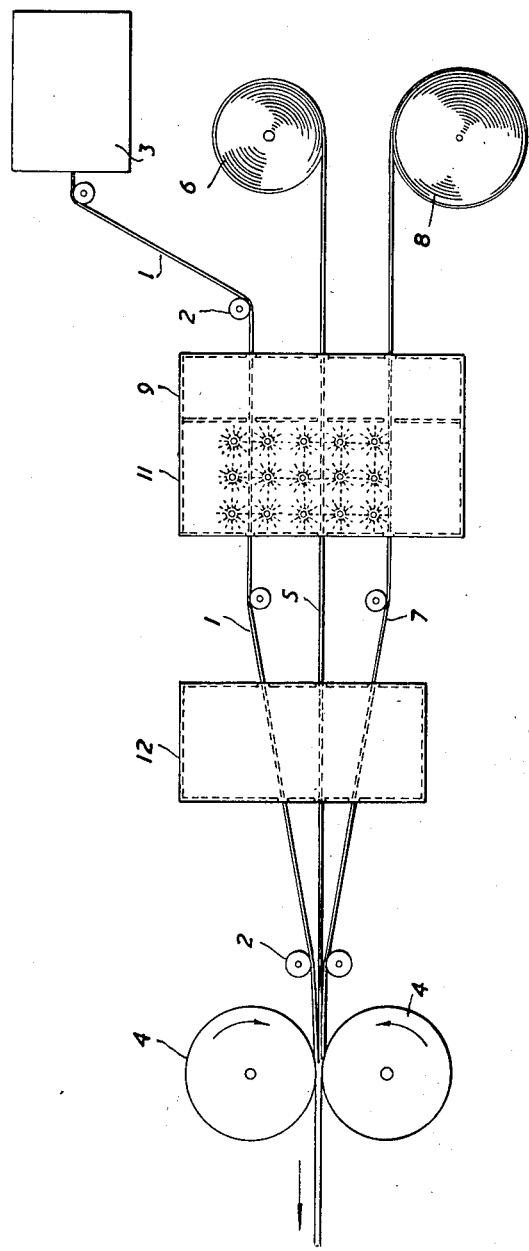

May 12, 1964  B. B. FULFORD  3,132,418
METHOD OF PRODUCING A COMPOSITE MATERIAL FOR PLAIN BEARINGS
Filed Feb. 7, 1962  2 Sheets-Sheet 1

INVENTOR
Bruce B. Fulford

BY Pierce, Schiffler & Parker
ATTORNEYS

INVENTOR
Bruce B. Fulford

United States Patent Office 3,132,418
Patented May 12, 1964

3,132,418
METHOD OF PRODUCING A COMPOSITE MATERIAL FOR PLAIN BEARINGS
Bruce Bennett Fulford, Wembley, Middlesex, England, assignor to The Glacier Metal Company Limited, Wembley, England, a company of Great Britain
Filed Feb. 7, 1962, Ser. No. 171,628
Claims priority, application Great Britain Feb. 13, 1961
7 Claims. (Cl. 29—471.1)

The present invention relates to a method of producing composite materials for use in the manufacture of plain bearings of the kind comprising a steel backing having bonded to a face thereof to form a bearing surface a layer of high-tin aluminium alloy.

The term "plain bearing" is to be understood as including any member or assembly having, or designed to have in use, a surface which bears directly or through a liquid or solid lubricant against another surface relatively to which it has sliding movement irrespective of whether the main or sole purpose is to transmit a load from one to the other of the surfaces having relative sliding movement or whether the sliding contact is solely or partly for some other purpose such, for example, as to provide a seal or to make electrical contact. The term thus includes such members as piston rings, pistons, cylinders and the cages or separators for ball or roller bearings and sliding electrical contact members such as brushes.

In the present invention a method of producing composite material for the manufacture of bearings comprising a steel backing having bonded to a face thereof a facing layer of high-tin aluminium alloy includes cleaning the face of a steel strip to which the facing layer is to be applied, cleaning both faces of a strip of aluminium foil, cleaning a face of a ductile strip of high-tin aluminium alloy which is to be bonded to the steel strip to form the facing layer, heating at least one of the strips selected from the group consisting of the high-tin aluminium alloy strip and the steel strip, and applying pressure, by rolling, simultaneously to the three strips while the high-tin aluminium alloy strip and/or the steel strip is in a heated state and the aluminium foil strip is positioned between the cleaned surfaces of the steel and the high-tin aluminium alloy strips, the pressure being such as to bond the three strips to one another to form the composite material.

It will be appreciated that in general while cleaning the face of the strip of high-tin aluminium alloy which is to be bonded to the steel strip it is convenient to clean the other face of the alloy strip in order to facilitate later manufacturing operations in, for example, the making of bearings from composite metal made by the above method.

The cleaning of the faces of the strips may be effected by degreasing followed by mechanical cleaning. Thus after degreasing the faces of the strips may be mechanically cleaned by scratch brushing. The face of the steel strip may be linished rather than scratch brushed, if so desired.

By a strip of "high tin aluminium" alloy is meant a strip of aluminium alloy in which the percentage by weight of tin is at least 5% and not more than 50%, and which includes at least 50% by weight of aluminium. Such an alloy may be such as to include in addition to aluminium and tin, 0.10% silicon, and/or 0–4% copper, and/or 0–4% nickel, and/or 0–4% manganese, and/or 0–1% iron, and/or 0–5% lead, and/or 0–0.5% beryllium, all of which percentages being percentages by weight, plus small amounts of impurities. Good results have been obtained in the method according to the invention when the percentage by weight of tin in the high-tin aluminium alloy is in the region between 17% and 23%.

The strip of aluminium foil may be substantially pure aluminium, for example 99.5% by weight of pure aluminium or it may be an alloy of aluminium including up to 7% magnesium and/or 1% silicon and/or 5% copper and/or 0.5% beryllium, and/or 0.5% chromium all of which percentages being percentages by weight, with the remainder aluminium with the usual small amounts of impurities.

In a method according to the invention the aluminium foil strip as well as the high-tin aluminium alloy strip or the steel strip, can be heated, or all three strips can be heated. The strips should not be heated to temperatures above about 230° C. and good results are obtained when, immediately in advance of the point where pressure is applied by rolling, the temperatures of the three strips are such that at least the temperature of the high-tin aluminium alloy strip is approximately 215° C.

In one example of the invention, prior to the rolling operation all three strips are placed in a suitable oven and heated so that the temperature of the strips immediately before rolling is approximately 215° C. The pressure applied to the strips during rolling is such as to reduce the thickness of the steel strip by approximately 50% and the thickness of the high-tin aluminium alloy strip by approximately 58%.

In another example of the invention the steel strip alone is heated, the strip being brought to a temperature of approximately 230° C., so that on delivery to the rollers for rolling with the other two strips and immediately before rolling takes place, the temperature of the steel is not more than 230° C.

In order for proper bonding of the high-tin aluminium alloy strip and the steel strip to take place during the rolling operation, the alloy of the strip must be ductile. Thus in some cases in order to obtain the required degree of ductility in the alloy and to improve its metallurgical properties, before rolling, the high-tin aluminium alloy strip is annealed and then scraped to remove any "tin bleed" from at least that face of the strip to be brought into contact with the aluminium foil during the rolling operation. Such treatment is of course unnecessary if the high-tin aluminium alloy available is of the required ductility and has appropriate metallurgical properties. Thus for example, no such treatment is required for high-tin aluminium alloy strip manufactured by certain continuous casting processes.

Figure 2:
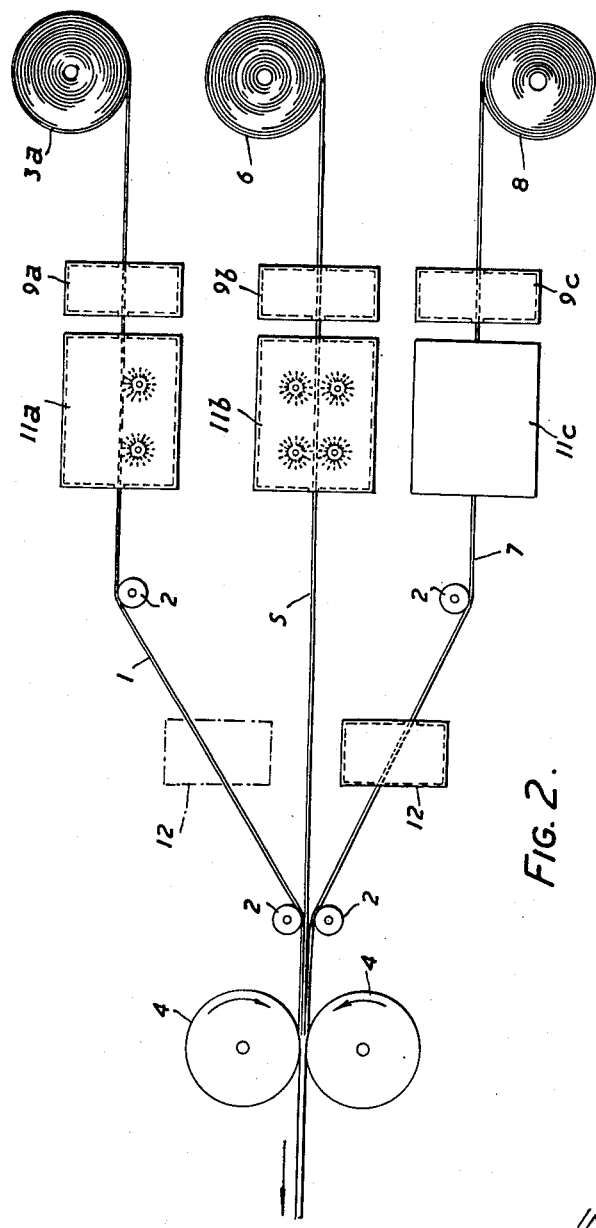

A preferred method of producing composite material according to the invention will now be described by way of example only with a reference to accompanying drawings, in which:

FIGURE 1 schematically illustrates plant operable in accordance with the invention, and FIGURE 2 illustrates an alternative form of such plant.

In the figures like reference numerals are used to indicate like parts.

In the arrangement of FIGURE 1 high-tin aluminium alloy strip 1 of suitable ductility and metallurgical properties is continuously delivered by suitable guide means 2 from a continuous casting plant 3 to the nip of a pair of power driven vertical rolls 4. Delivered also to the rolls 4 by the guide means are a strip of aluminium foil 5 drawn from a reel 6 and a strip of steel 7 drawn from a reel 8.

Before being brought together at the nip of the rolls 4 the strips, which are of substantially the same width, pass through a combined degreasing 9 and scratch brushing machine 11 where the strips are degreased and each face of a strip which during rolling is to be brought into contact with a face of another one of the strips is cleaned by scratch brushing. After passing through the scratch brushing machine 11 the strips pass through an induction furnace 12 before being brought together by the guide means 2 and delivered into the nip of the rolls 4. When passing through the nip the strips are aligned and arranged one upon another with the strip of aluminium foil interposed between the other two strips.

In the induction furnace the strips are heated to a temperature which is such that those parts entering between the rolls are at a temperature which is preferably about 215° C. but which does not exceed 230° C.

The pressure applied to the strips during rolling as a result of a vertical load applied to the upper one of the two rolls is such as to reduce the thickness of the steel strip by approximately 50% and the thickness of the high-tin aluminium alloy strip by approximately 58%, and at the same time cause the three layers to bond together as a result, it is believed, of welding occurring between the faces of the strips. Both rolls are driven so that the high-tin aluminium alloy strip after delivery from the continuous casting plant 3 is automatically drawn along the guide means to the rolls without the use of separate driving means. In the same way the aluminium foil and steel strips also are drawn to the rolls along the guide means from their respective reels.

The single strip of composite material which comprises the three strips bonded together is delivered from the rolls to a coiler (not shown) where it is wound into a coil, or is delivered to a continuous annealing furnace (not shown) from which it is transferred, after annealing, to bearing manufacturing plant. Annealing preferably takes place for a period of approximately 1½ hours at 350° C., and, before delivery to the bearing manufacturing plant, the high-tin aluminium alloy layer of the composite material has its exposed surface scraped to remove any "tin bleed" which may have occurred during annealing.

The speed at which the coiler is driven is of course such as to accommodate the elongation of the strip material resulting from the rolling operation. When the strips delivered to the rolls from the reels 6 and 8 are used up known means (not shown) are arranged automatically to deliver further strip to the rolls from replacement reels in order to maintain continuous production of composite material.

In the method above described the high-tin aluminium alloy and the aluminium strips may have compositions within the limits above specified. Preferably, however, the tin and copper content, by weight, of the high-tin aluminium alloy used is as follows:

Tin—17.5 to 22.5%   Impurities—1.5% maximum
Copper—0.7 to 1.3%   Aluminium—Remainder In the preferred method all three strips are heated but in alternative methods according to the invention either or both the steel and the high tin aluminium alloy strips are heated and the other strip(s) left un-heated. Thus in the plant illustrated in FIGURE 2 one or other of the high-tin aluminium alloy and steel strips is heated in an induction furnace (12a or 12b). Moreover, as illustrated in FIGURE 2, the high-tin aluminium alloy strip is delivered to the rolls from a coil 3a in the manner described above for the steel and aluminium strips rather than from a continuous casting plant, such high-tin aluminium alloy strip, before coiling, having been rolled from billet and then annealed to bring it to appropriate ductility. Thus, high-tin aluminium alloy strip rolled from billet may be subjected to a temperature of approximately 350° C. for a period of approximately 1½ hours, and afterwards scraped to remove any "tin bleed" from at least that face of the strip to be brought into contact with the aluminium foil strip during the rolling operation.

In the plant illustrated in FIGURE 1 both faces of the high-tin aluminium alloy strip are scratched brushed in order to facilitate later manufacturing operations although for manufacture of composite material according to the invention it is only necessary that that face of the high-tin aluminium alloy strip to be brought into contact with the aluminium foil strip be cleaned, as is the case in the plant shown in FIGURE 2.

Moreover, in this modification, instead of a combined degreasing and scratch brushing machine 9, 11 arranged to treat all three strips, a separate mechanical cleaner 11a, 11b, 11c is provided for each strip, as is also a separate degreasing apparatus 9a, 9b, 9c. The mechanical cleaner 11c for the steel strip may be either a scratch brushing or linishing machine.

Methods according to the invention are not confined to those which are continuous but includes also intermittent processes in which, for example, after cleaning and prior to being bonded together by rolling, short lengths of high-tin aluminium alloy strip, steel strip and aluminium foil strip are arranged in groups of three with each group including strips of each kind arranged one upon another with the aluminium foil interposed between the steel and the high-tin aluminium alloy strip and in contact with their cleaned faces. The groups are then subjected in a gas oven or the like to a temperature of 215° C. for about 20 minutes so that they are evenly heated throughout, and following which are passed, one after another, through the nip of the rolls to form a series of single strips of composite material.

Plain bearings may be formed from the composite strip in any suitable well-known manner of forming plain bearings from strip material.

What I claim as my invention and desire to secure by Letters Patent is:

1. A method of producing composite material for the manufacture of bearings comprising a steel backing having bonded to a face thereof a facing layer of high-tin aluminium alloy which includes cleaning the face of a steel strip to which the facing layer is to be applied, cleaning both faces of a strip of aluminium foil, cleaning a face of a ductile strip of high-tin aluminium alloy which is to be bonded to the steel strip to form the facing layer, heating at least one of the strips selected from the group consisting of the high-tin aluminium alloy strip and the steel strip, and applying pressure, by rolling, simultaneously to the three strips while the heated strip is at a temperature within the range from about 215° C. to 230° C. and with the aluminium foil strip positioned between the cleaned surfaces of the steel and the high-tin aluminium alloy strips, the pressure being such as to bond the three strips to one another to form the composite material.

2. A method as claimed in claim 1 in which the cleaning of the faces of the respective strips is effected by degreasing and mechanical cleaning.

3. A method as claimed in claim 1 wherein the pressure applied by rolling is such as to substantially reduce the thicknesses of the steel strip and the high-tin aluminium alloy strip.

4. A method as claimed in claim 3, in which the pressure is such as to reduce the thickness of the steel strip by approximately 50% and the thickness of the high-tin aluminium alloy strip by approximately 58%.

5. A method as claimed in claim 1 in which prior to the rolling operation the high-tin aluminium alloy strip is first subjected to an annealing operating at a temperature of approximately 355° C. for a period of approximately 1½ hours and then scraped to remove any "tin bleed."

6. A method as claimed in claim 1 in which the high-tin aluminium alloy strip is delivered for cleaning prior to the rolling operation directly from continuous casting means.

7. A method as claimed in claim 1 in which the composite material is annealed at a temperature of about 350° C.

References Cited in the file of this patent

UNITED STATES PATENTS

| | | |
|---|---|---|
| 2,284,703 | Welblund et al. | June 2, 1942 |
| 2,767,469 | Siegel | Oct. 23, 1956 |
| 2,879,587 | Mushovic et al. | Mar. 31, 1959 |

FOREIGN PATENTS

| | | |
|---|---|---|
| 722,552 | Great Britain | Jan. 26, 1955 |